United States Patent
Fernandez Duran et al.

(10) Patent No.: US 11,510,070 B2
(45) Date of Patent: Nov. 22, 2022

(54) DEVICE FOR DEPLOYING ACCESS POINTS IN A WIRELESS NETWORK AND A METHOD THEREFOR

(71) Applicant: Nokia Solutions and Networks Oy, Espoo (FI)

(72) Inventors: Alfonso Fernandez Duran, Madrid (ES); Tomas Sanjuan Flores, Madrid (ES)

(73) Assignee: Nokia Solutions and Networks Oy, Espoo (FI)

( * ) Notice: Subject to any disclaimer, the term of this patent is extended or adjusted under 35 U.S.C. 154(b) by 45 days.

(21) Appl. No.: 17/136,745

(22) Filed: Dec. 29, 2020

(65) Prior Publication Data

US 2021/0235279 A1   Jul. 29, 2021

(30) Foreign Application Priority Data

Jan. 24, 2020  (EP) .................................... 20153641

(51) Int. Cl.
*H04W 24/02* (2009.01)
*H04W 16/18* (2009.01)
(Continued)

(52) U.S. Cl.
CPC .......... *H04W 16/18* (2013.01); *H04B 17/318* (2015.01); *H04W 24/02* (2013.01);
(Continued)

(58) Field of Classification Search
CPC ..... H04W 16/18; H04W 24/02; H04W 24/10; H04W 52/367; H04W 84/18; H04W 16/20; H04W 84/12; H04W 88/08; H04B 17/318
See application file for complete search history.

(56) References Cited

U.S. PATENT DOCUMENTS 8,311,558 B2 * 11/2012 Davidson .................. G01S 5/12
455/422.1
8,953,457 B2 * 2/2015 Zou .......................... H04L 45/00
370/356
(Continued)

FOREIGN PATENT DOCUMENTS

| EP | 3188527 A1 * | 7/2017 | ............ H04W 16/18 |
| GB | 2478521 A * | 9/2011 | .......... H04B 17/318 |
| WO | WO-2020076060 A1 * | 4/2020 | ............. H04L 41/12 |

OTHER PUBLICATIONS

European Search Report for European Application No. 20153641.4 dated Jun. 3, 2020.
"Indoor Localization Within Multi-story Buildings Using MAC and RSSI Fingerprint Vectors", by Litao Han, Li Jiang, Qiaoli Kong, Ji Wang, Aiguo Zhang, Shiming Song in <https://www.mdpi.com/1424-8220/19/11/2433/pdf>.
(Continued)

*Primary Examiner* — Julio R Perez
(74) *Attorney, Agent, or Firm* — Harness, Dickey & Pierce, P.L.C.

(57) ABSTRACT

Various example embodiments describe a method comprising the steps of: obtaining, channel strengths between access points, APs, and areas covered by the APs; determining from the obtained channel strengths, propagation losses between the areas; identifying first pairs of areas with lower propagation losses and second pairs of areas with higher propagation losses; selecting, from the first pairs of areas, candidate areas for deploying mesh-operated APs; and determining, from the second pairs of areas, coverage by the respective mesh-operated APs when deployed in one or more of the candidate areas.

14 Claims, 4 Drawing Sheets

(51) Int. Cl.
  *H04B 17/318* (2015.01)
  *H04W 24/10* (2009.01)
  *H04W 52/36* (2009.01)
  *H04W 84/18* (2009.01)

(52) U.S. Cl.
  CPC ......... *H04W 24/10* (2013.01); *H04W 52/367* (2013.01); *H04W 84/18* (2013.01)

(56) References Cited

U.S. PATENT DOCUMENTS

| | | | |
|---|---|---|---|
| 9,924,513 B2* | 3/2018 | Sidhu | H04W 72/0453 |
| 11,178,662 B2* | 11/2021 | Chen | H04W 40/12 |
| 2015/0009857 A1* | 1/2015 | Rath | H04L 41/5035 370/254 |
| 2015/0052255 A1 | 2/2015 | Sun et al. | |
| 2017/0272317 A1* | 9/2017 | Singla | H04L 67/02 |
| 2018/0091939 A1 | 3/2018 | Venkatraman et al. | |
| 2018/0278325 A1 | 9/2018 | Feki et al. | |
| 2019/0104411 A1* | 4/2019 | Hotchkiss | H04L 63/107 |
| 2021/0235279 A1* | 7/2021 | Fernandez Duran | H04W 24/10 |

OTHER PUBLICATIONS

"Placement Optimization of Positioning Nodes: Maximizing the Distinction of Indoor Zones", by Dimitris Xenakis, Martijn Meijers, Edward Verbree in https://www.int-archphotogramm-remote-sens-spatial-inf-sci.net/XLII-2-W13/909/2019/isprs-archives-XLII-2-W13-909-2019.pdf.

"Optimal Placement of Access Point in WLAN Based on a New Algorithm", by S. Kouhbor, J. Ugon, A. Kruger, A. Rubinov in <https://ieeexplore.ieee.org/stamp/stamp.jsp?tp=&arnumber=1493667>.

"Gateway Placement for Throughput Optimization in Wireless Mesh Networks", by Fan Li, Yu Wang, Xiang-Yang Li in http://www.cs.iit.edu/~xli/paper/Conf/gateway-placementv1.Pdf.

"Investigation of WLAN Access Point Placement for Indoor Positioning", by Árpád Huszák, Gy?z? Gódor, Károly Farkas in https://link.springer.com/content/pdf/10.1007%2F978-3-642-32808-4_32.pdf.

"Best Practices-Location-Aware WLAN Design Considerations" in https://www.cisco.com/c/en/us/td/docs/solutions/Enterprise/Mobility/WiFiLBSDG/wifich5.html.

* cited by examiner

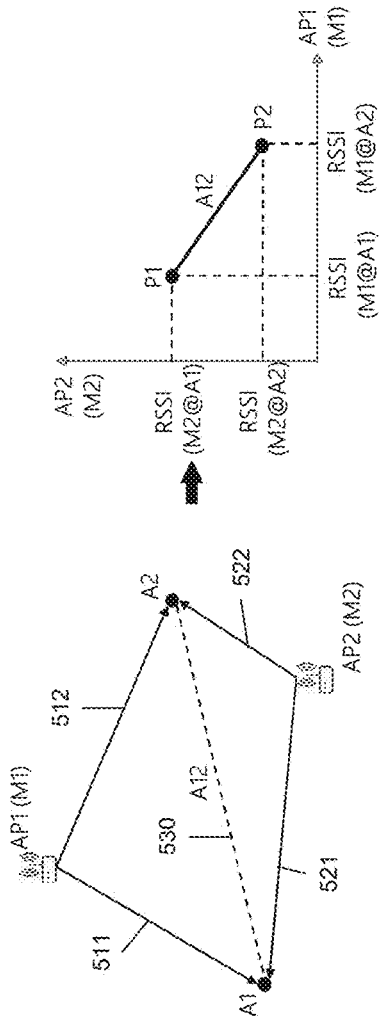
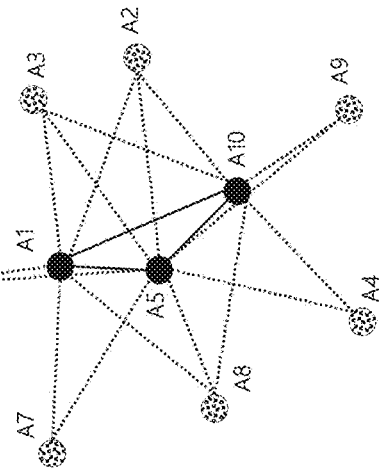
Fig. 4
Fig. 5
Fig. 6

DEVICE FOR DEPLOYING ACCESS POINTS IN A WIRELESS NETWORK AND A METHOD THEREFOR

CROSS-REFERENCE TO RELATED APPLICATIONS

The present application claims priority under 35 U.S.C. § 119 to European Patent Application No. 20153641.4, filed on Jan. 24, 2020, in the European Patent Office, the entire contents of each of which are hereby incorporated by reference.

TECHNICAL FIELD

Various example embodiments relate to a device and a method for deploying wireless networks, and, more particularly wireless mesh networks.

BACKGROUND

Wireless networks are widely used to provide internet access in indoor environments, such as homes, office and/or industrial buildings, to avoid the costly process of introducing cables into a building. Wireless networks are communication networks that use wireless data connections between network nodes, such as access points, APs, organized in a certain topology to provide internet access to mobile and/or stationery client devices like cell phones, laptops, etc. The wireless network links the client devices to an access point and in turn to the Internet via a gateway, GW. In a star topology, the APs are directly connected to the gateway device, while in a mesh topology, the APs connect directly and/or indirectly to the gateway through one or more other APs in the network. In a mesh topology the APs and the GW are thus interconnected to each other, allowing all nodes to participate in relaying information. Wireless mesh networks may be self-organizing and self-configuring, i.e. establish the meshed interconnection automatically. The ability to self-configure enables dynamic distribution of workloads, particularly in the event where a few nodes should fail. This in turn contributes to fault-tolerance and reduced maintenance cost.

Deploying wireless mesh networks in indoor environments is however a complex task. Therefore, to assure a good coverage for the client devices throughout the indoor environment may require a good understanding of the environment, such as its layout and dimensions, the building materials used, etc.

SUMMARY

Amongst others, it is an object of embodiments of the invention to provide a solution for deploying wireless mesh networks in indoor environments.

The scope of protection sought for various embodiments of the invention is set out by the independent claims.

The embodiments and features described in this specification that do not fall within the scope of the independent claims, if any, are to be interpreted as examples useful for understanding various embodiments of the invention.

This object is achieved, according to a first example aspect of the present disclosure, by a method comprising the steps of:
  obtaining, channel strengths between access points, APs, and areas covered by the APs;
  determining from the obtained channel strengths, propagation losses between the areas;
  identifying first pairs of areas with lower propagation losses and second pairs of areas with higher propagation losses;
  selecting, from the first pairs of areas, candidate areas for deploying mesh-operated APs; and
  determining, from the second pairs of areas, coverage by the respective mesh-operated APs when deployed in one or more of the candidate areas.

Channel strength between the APs already deployed in the vicinity of or within the indoor environment and the different areas of the indoor environment are obtained. The received signal strength indicator, RSSI, may be used as an indication for the channel strength. Other parameters such as the channel capacity and the signal to noise ration may also be used as a direct or indirect indication for the channel strength. From the obtained channel strengths, propagation losses between the different areas may be obtained. The propagation losses are indicative for the wireless signal propagation throughout the environment. For example, a propagation loss between a pair of areas characterizes the power of the signal received by client devices located in one of the areas from an AP deployed in the other area. Depending on the propagation loss between a pair of areas, an AP deployed in one area may be or may not be able to provide a signal with sufficient power to the client device located in the other area. In other words, the coverage area of an AP depends on the propagation loss. For example, in case of low propagation loss between areas, client devices might be able to connect to the AP and have a reliable connection with the AP, while in case of high propagation loss, the client devices might not be able to connect to the AP at all. In turn, this allows estimating the coverage provided by an AP of the mesh network when deployed in the environment, and, therefrom the total coverage of a mesh network.

By identifying pairs of areas with lower propagation losses, candidate areas for deploying mesh-operated APs may be obtained, and, by identifying pairs of areas with higher propagation losses, the coverage of the APs when deployed in the candidate areas may be obtained. This allows deriving the number of the mesh-operated APs required to provide a good coverage for the respective areas, as well as, their coverage when deployed in the candidate areas.

Deriving the propagation losses in this manner and in turn the AP's deployment areas and coverage of the mesh network does not require knowledge of the exact location of the already deployed APs nor georeferencing of the channel strength measurements. Furthermore, understanding of the indoor environment, such as its layout and dimensions, the building materials used, etc. is neither required. Instead, the proposed method uses information obtained from already available wireless network infrastructure to derive the AP's deployment areas and coverage of the mesh network. Therefore, a low-complexity method which may be run on any device with adequate processing capabilities, such as smart mobile devices, desktop computers and the like, capable of determining the candidate areas for deploying the mesh-operated APs and the coverage of the mesh network is provided.

According to example embodiments, the method comprising further selecting areas from the candidate areas for deploying mesh-operated APs such that coverage is maximized.

By deriving the coverage of mesh-operated APs when deployed in a respective candidate area, an optimum selection of deployment areas, and, therefore an optimum number of the mesh-operated APs providing a maximized coverage may be obtained.

According to example embodiments, the further selecting is based on one or more preferred areas for deploying mesh-operated APs and/or on a pre-determined maximum number of areas for deploying mesh-operated APs.

Areas where a good coverage is preferred may be specified. Such areas may be labelled according to the preferences of a user. For example, a preference score may be assigned to a respective area. A high preference score may be assigned to areas, such as living room or a conference room, to indicate that a good coverage is preferred or even required, while a low preference score where coverage is undesired may be assigned to areas, such as garden areas, sanitary areas or meditation areas. The preference score may be assigned by a user. Alternatively, the preference score may be pre-determined based on the function of a respective area. Additionally, a mandatory score may be specified. For example, in case the fibre connection to the Internet is in the living room, a mandatory score may be set to the living room to enforce deploying one of the mesh-operated AP therein. In case of pre-existing wired connections, e.g. Ethernet cable, between different rooms, a mandatory score may be set to these areas as well. Further, a maximum number of APs to be deployed may be specified as well. One or more configurations satisfying the user preferences may be obtained. Again, the user may select the configuration that fits his preferences best. This way, the configuration of the mesh network to be deployed may be easily adjusted to the specifics of the indoor environment and the user requirements.

According to further example embodiments, the method further comprises obtaining communication bands of the respective APs and selecting therefrom a communication band for the mesh-operated APs based on a lowest channel occupancy. According to example embodiments, the selecting a communication band for the mesh-operated APs further comprises selecting a communication band for communication between the mesh-operated APs different from a communication band for communication between the mesh-operated APs and client devices located within the areas.

Different already deployed APs may use different communication bands which may be pre-set by the manufacturer or chosen by their user. Therefore, obtaining the communication bands used by the already deployed APs allows obtaining information of the actual occupancy of the communication bands, and therefrom communication bands with the lowest occupancy. These communication bands may be then used as communication bands for the mesh-operated APs may be derived. For example, one of the thus derived communication bands may be used for communication between the APs, while others for the communication between the client devices and the APs. This way, once deployed, the mesh network will be able to provide reliable service to the client devices and conflicts with the already deployed APs are avoided.

According to further example embodiments, the method further comprising calculating a minimum transmission power for the mesh-operated APs based on the propagation losses. This way, the interference between the mesh-operated APs within the mesh wireless network is minimized.

According to further example embodiments, the method further comprises measuring a signal strength between a respective AP and a plurality of locations within a respective area.

A signal strength between a respective AP and the respective area may be obtained by measuring the signal strength at different locations within the respective area. The user may take one or more measurements in an area. For a small area with a simple shape, for example a square room, one measurement of the power of the received signal may be sufficient. The measurement may be taken anywhere in the room. Preferably, the measurement is taken in the middle of the room. This way, average representation of the signal strengths for the room may be obtained. For a bigger size room, one measurement however might not be sufficient as the signal strength for an APs may vary significantly in different location in the area. Therefore, it is preferred to take multiple measurements. The measurements may be taken in a random manner, for example along the diagonal of the room, along a circle or along any other suitable path. For a room with a more complex shape, for example L- or U-shape rooms, the room may be subdivided in smaller areas and one or more measurements may be taken within each area as detailed above. The measurement process is flexible as it is not required to take measurements along the same path in each area. Advantageously, limited number of measurements per area are sufficient. On average, measurements at up to 10 different locations within an area suffices and in some cases one measurement suffices.

This way, possible mesh network configurations may be derived on the spot right after the measurements have been obtained. Further, transfer of measurement data to another device is avoid.

According to further example embodiments, the method further comprising calculating, from the measured signal strengths, a channel strength between the respective AP and the respective area representative for the measured signal strengths.

A channel strength representative for the measured signal strengths between the respective AP and the respective area may be obtained by calculating, for example, the median or mean of the signal strengths measured for the different locations within the respective area. A more precise channel strength value may be calculated using weighted average, least mean square or similar algorithms. This way one signal strength value representative for the signal strength for a respective AP for that area may be obtained which further allows limiting the complexity of the proposed method.

According to other example embodiments, a respective area may be a room or a part of a room.

Area in an indoor environment may be a different space in a building, such as a room in a residential or an office in an office building. Furthermore, an area may be a region in a room or an office space, for example a region in an open-plan work environment, etc.

According to other example embodiments, the processing steps of example embodiments above may be performed by a processing module located in the cloud.

The measured data may be forwarded to a processing unit in the cloud. This way the device with which the measurements are obtained requires limited to no processing capabilities, as the processing are done on a remote device, for example, on a server located in the cloud.

According to a second example aspect a device is disclosed comprising a processing module configured:
 to obtain channel strengths between access points, APs, and areas covered by the APs;
 to determine, from the obtained channel strengths, propagation losses between the areas;

to identify first pairs of areas with lowest propagation losses and second pairs of areas with highest propagation losses;

to select, from the first pairs of areas, candidate areas for deploying mesh-operated APs; and to determine, from the second pairs of areas, coverage by the respective mesh-operated APs when deployed in one or more of the candidate areas.

As detailed in the first example aspect, from the obtained channel strengths between already deployed access points, APs, and the areas covered by the respective APs, propagation losses between the different areas may be obtained. This in turn allows estimating the number of mesh-operated APs and their coverage when deployed in an area of the indoor environment.

By identifying pairs of areas with lower propagation losses, candidate areas for deploying mesh-operated APs may be obtained, and, by identifying pairs of areas with higher propagation losses, the coverage of the APs when deployed in the candidate areas may be obtained. This allows deriving the number of the mesh-operated APs required to provide a good coverage for the respective areas, as well as, their coverage when deployed in the candidate areas.

Deriving the propagation losses in this manner does not require the usage of a specialized device, nor, understanding of the indoor environment, such as its layout and dimensions, the building materials used, etc. Instead, useful information obtained from already available wireless network infrastructure is used to derive the mesh-operated AP's deployment areas and coverage of the mesh network. This way, any device with adequate processing capabilities, such as smart mobile devices, desktop computers and the like suffices to determine the candidate areas for deploying the mesh-operated APs and the coverage of the mesh network.

According to example embodiments, the processing module is configured to further select areas from the candidate areas for deploying mesh-operated APs such that coverage is maximized.

According to other embodiments, the processing module is configured to select areas from the candidate areas is based on one or more preferred areas for deploying mesh-operated APs and/or on a pre-determined maximum number of areas for deploying mesh-operated APs.

Areas where a good coverage is preferred may be specified. Such areas may be labelled according to the user preference. For example, a preference score may be assigned to a respective area. The preference score may be assigned by a user. Alternatively, the preference score may be pre-determined based on the function of a respective area. Further, a maximum number of APs to be deployed may be specified as well. One or more configurations satisfying the user preferences may be obtained. Again, the user may select the configuration that fits his preferences best. This way, the configuration of the mesh network may be easily adjusted to the specifics of the indoor environment and the user requirements.

According to further embodiments, the device further comprises a measuring module configured to measure a signal strength between a respective AP and a plurality of locations within a respective area; and wherein the processing module is further configured to calculate, from the measured signal strengths, a mean channel strength between the respective AP and the respective area.

The other example embodiments of the first example aspect may further be applied as example embodiments to the second example aspects.

According to a third example aspect a computer program product is disclosed comprising computer-executable instructions for causing a computer to perform at least the following:

obtaining, channel strengths between access points, APs, and areas covered by the APs;

determining from the obtained channel strengths, propagation losses between the areas;

identifying first pairs of areas with lower propagation losses and second pairs of areas with higher propagation losses;

selecting, from the first pairs of areas, candidate areas for deploying mesh-operated APs; and determining, from the second pairs of areas, coverage by the respective mesh-operated APs when deployed in one or more of the candidate areas.

According to a fourth example aspect a computer readable storage medium is disclosed comprising computer-executable instructions for performing the following steps when the program is run on a computer:

obtaining, channel strengths between access points, APs, and areas covered by the APs;

determining from the obtained channel strengths, propagation losses between the areas;

identifying first pairs of areas with lower propagation losses and second pairs of areas with higher propagation losses;

selecting, from the first pairs of areas, candidate areas for deploying mesh-operated APs; and determining, from the second pairs of areas, coverage by the respective mesh-operated APs when deployed in one or more of the candidate areas.

The various example embodiments of the first example aspect may be applied as example embodiments to the third and fourth example aspects.

BRIEF DESCRIPTION OF THE DRAWINGS

Some example embodiments will now be described with reference to the accompanying drawings.

FIG. 4 shows an example embodiment of a suitable computing system 500 for performing one or several steps in embodiments of the invention.

FIG. 5 shows an example of a propagation loss array according to the present disclosure.

FIG. 6 shows a graph representation of an example mesh network configuration according to the present disclosure.

DETAILED DESCRIPTION OF EMBODIMENT(S)

Figure 1:
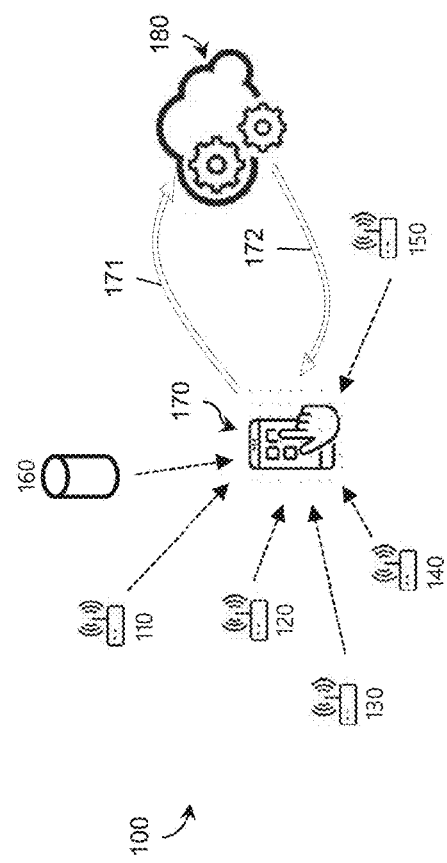
FIG. 1 shows an overview of the method according to the present disclosure.
Figure 2:
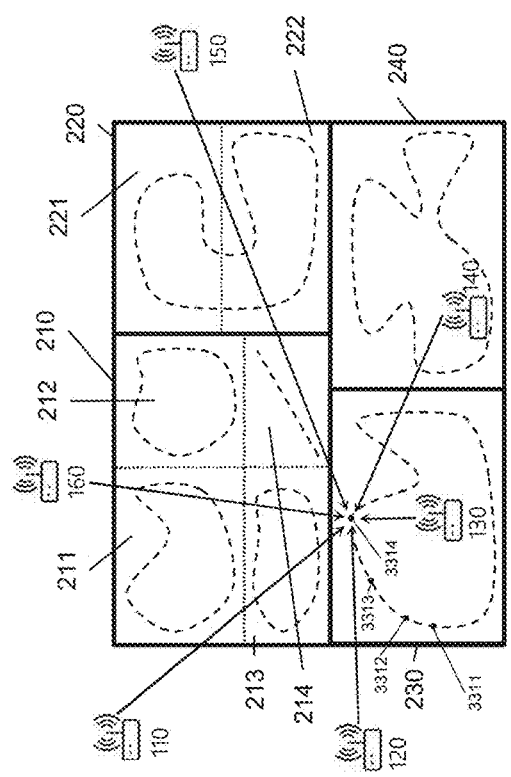
FIG. 2 shows an example application of the method in an indoor environment according to the present disclosure.

FIG. 1 shows an example of a communication network 100 comprising a plurality of access points, APs, 110-160, deployed in an indoor environment which may comprise one or more rooms. FIG. 2 shows an example of an indoor environment comprising four rooms 210-240 with APs 130 and 140 located within rooms 230 and 240, respectively, and, APs 110, 120, 150 and 160 in the surroundings of room 210, 220 and 230. As shown in the figure, room 210 is divided in four areas 211-214, room 220 is divided into two areas 221-222, and, rooms 230 and 240 are undivided. In other words, room 210 is represented by four areas 211-214, room 220 by two areas 221-222 and rooms 230 and 240 by their respective areas.

Figure 3:
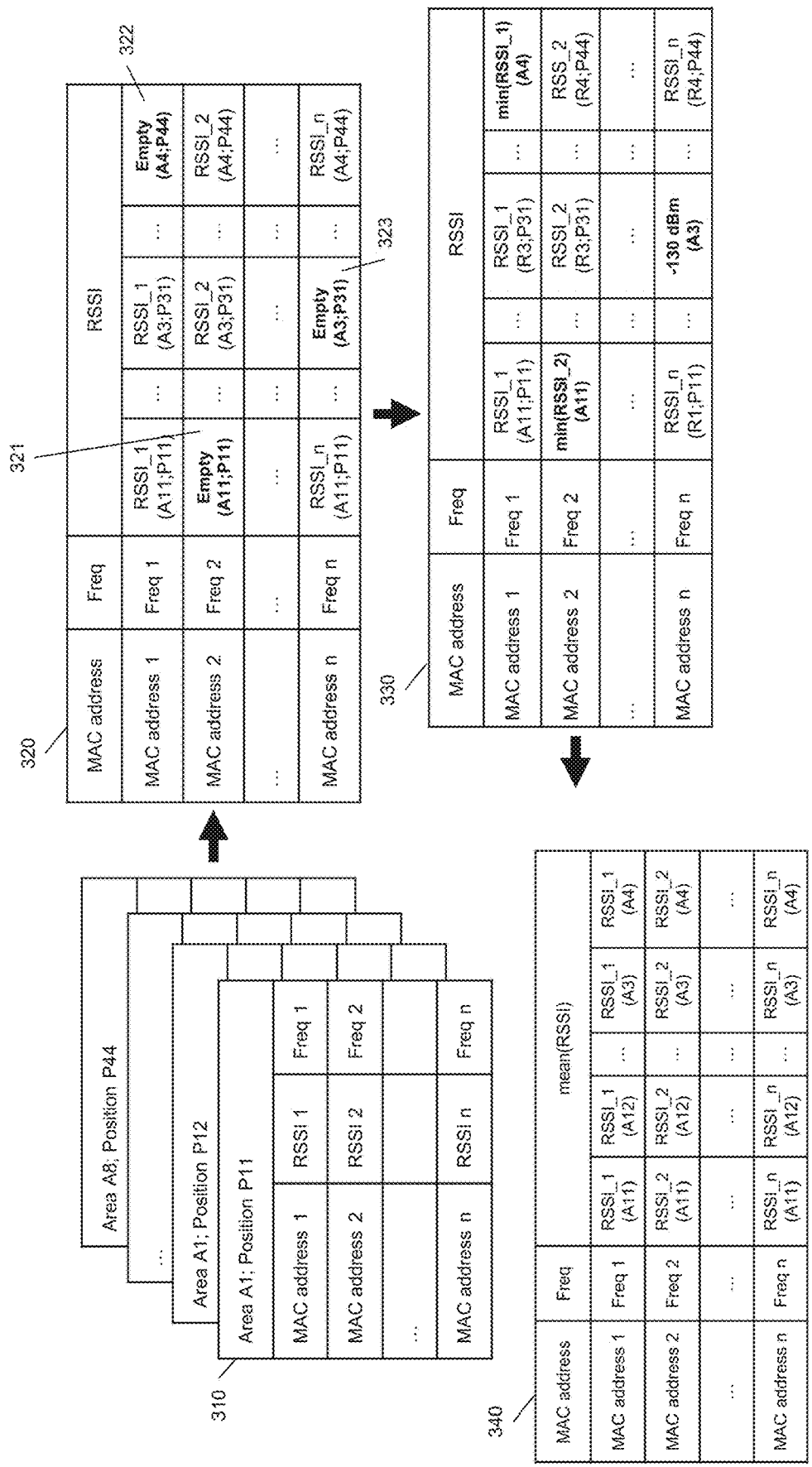
FIG. 3 shows various steps of the method according to the present disclosure.

A device 170, such as a smart mobile device, obtains information about the already deployed wireless networks in the neighbourhood of and/or within the indoor environment by measuring. For example, a user or an installer may start a mesh deployment application on its mobile phone and initialize a measuring session for an area by setting a label identifying the area within which measurements will be taken. The area label may be, for example, 'living room southern area', 'living room northern area', 'bedroom', 'terrace', etc. Initializing the measuring session activates the measurement module of the device 170. The measurement module measures the channel strength between the respective APs and a respective location within the area. For example, the received signal strength indicator, RSSI, which is a measurement of the power present in a received radio signal at a specific location, may be used as a measure to indicate the channel strength. The user may take a one or more measurements while walking in any suitable way within the area. For example, the user may walk in a straight line, a circle or in a random manner, as shown with the dashed lines. Alternatively, if the area label is not entered before the start of the measurement session, the area label may be entered once the measuring session for the respective area is completed. This way, the measurements are associated with a respective area. In addition to measuring the signal strengths, any information identifying unambiguously the APs, such as the media access control, MAC, addresses, and, the communication bands of the APs are obtained as well. The information obtained at each location within the respective area is stored in a look-up table, LUT, 310. FIG. 3 shows an example of such LUTs, where each LUT 310 includes the MAC address and communication band, Freq, used by the respective APs and their respective RSSI value measured at a specific location. That is, for each respective area 211-214, 221-222, 230 and 240 one or more LUTs are created depending on the number of measurements taken within an area.

For example, in area 230, measurements at multiple locations 3311-3314 are taken along a concave route as indicated with the dashed line. As the signal strength depends on various factors, such as the distance between the measurement location and the AP and the building materials absorption and reflection on the radio waves, the measured RSSI may vary significantly from one location to another. For example, at location 3314, the device 170 may measure high power for the radio signal received from APs 110 to 140, low power for the radio signal received from AP 160, and, no power for the radio signal from AP 160 as distance between the AP 170 and the device is so big that no signal is received. Therefore, the LUTs 310 may contain information for different APs.

The measuring process requires limited input from the user, as the user only needs to start and stop a measuring session and input a label for the respective area. The measurement may be taken automatically. The interval may be pre-defined and modified by the user. For example, measurements may be taken at every 5 to 10 secs or every 1 to 5 mins. The measuring session may be stopped after sufficient measurements within the area are taken and be re-started later on to take measurements in the remaining areas.

Once measurements in all areas are obtained, the processing module of the device 170 builds a master LUT 320 from the data recorded in the LUTs 310. The master LUT 320 contains the recorded MAC addresses with their associated communication bands, Freq, and the RSSI values measured at the different locations within the areas 211 to 214, 221 to 222, 230 and 240. The information in the master LUT 320 may be sorted according to the MAC addresses. The thus obtained master LUT 320 contains a unique list of MAC addresses (i.e. each of the MAC addresses appears only once) and the measured information associated to the respective MAC addresses.

As detailed above, it is possible that at some locations, no RSSI is recorded for one or more APs because the power of the received signal from a respective AP is so low that it may not be measured by the device 170. Therefore, the master LUT 320 may contain several empty cells, such as cells 321 to 323. In case RSSI values for a respective AP were recorded at some of, but not all, locations within the area, then the empty cell is filled with the minimum RSSI value recorded for the respective AP within the respective area. For example, the cell 321 is filled with the minimum RSSI value measured for the AP with MAC address 2 within the area A11. Similarly, the cell 322 is filled with the minimum RSSI value measured for the AP with MAC address 1 within the area A4. If, however, no RSSI value for a respective AP was recorded at any of the locations within the area, then the empty cell, i.e. cell 323, is filled with a reference value, e.g. −130 dBm. A fully filled master LUT 330 is thus obtained.

Propagation losses between different locations are then computed from the RSSI values in the fully filled master LUT 330. To lower computation complexity and thus the requirements on the processing unit, the propagation losses may be computed based on a signal strength value for a room (or area) rather than for a location within an area as follow. First, a mean RSSI value for a respective AP for an area is determined by calculating the mean or the median of the signal strengths for that AP measured within that area. Thus, mean signal strengths for each of the APs per area are obtained. If only one RSSI value is measured within an area, this measurement is taken as the mean value for that area. A LUT 440 containing the mean RSSI values per area is therefore obtained. Herein, the RSSI_1(A11) corresponds to the RSSI for the AP with a MAC address 1 for area A11, RSSI_1(A12) corresponds to the RSSI for the AP with a MAC address 1 for area A12 and so on.

Alternatively, instead of a mean RSSI value, a median RRSI value may be calculated. If a more precise representative signal strength value is required, the RSSI value may be calculated using weighted average, least mean square or similar algorithms.

The propagation losses between two areas A1 and A2 may be determined as shown in FIG. 4. When using a vector representation, the propagation loss for an access point between the two areas is represented as a subtraction of two vectors. As shown on the left, the RSSI values for access point AP1 measured at areas A1 and A2 are shown as vectors 511 and 512, respectively, and, the propagation loss L12 between the two areas as vector 530. Similarly, the recorded RSSI values for the access point AP2 measured at the areas A1 and A2 are shown as vectors 521 and 522, respectively, and, the propagation loss as vector 530. When using a coordinate system, the RSSI values between access points AP1 and AP2 and areas A1 are represented with points P1 and P2. For example, point P1 has coordinates x and y, where the x coordinate, RSSI (AP1@A1), corresponds to the RSSI value for AP1 measured at area A1, and, the y coordinate, RSSI (AP2@A1), corresponds to the RSSI value for access point AP2 measured at area A1. Similarly, point P2 has coordinates x and y, where the x coordinate, RSSI (AP1@A2), corresponds to the RSSI value for AP1 measured at area A2, and, the y coordinate, RSSI (AP2@A2), corresponds to the RSSI value for AP1 measured at area A2. The propagation loss A12 between the two locations is the distance between the points P1 and P2.

The propagation losses between two areas may be therefore approximated by:

$$L_{jk} \cong \sqrt{\Sigma_{i=1}^{n}(RSSI_{ij} - RSSI_{ik})^2} \quad (1)$$

where, $L_{jk}$ corresponds to the propagation losses between areas $A_j$ and $A_k$, RSSI corresponds to the power of the signal received from access point $AP_i$ measured at area $A_j$, i.e. the RSSI value, in dB. Repeating the above calculation for every pair of areas, results in a symmetric array $$L_n = \begin{pmatrix} L_{11} & \cdots & L_{1n} \\ \vdots & \ddots & \vdots \\ L_{n1} & \cdots & L_{nn} \end{pmatrix} \quad (2)$$

wherein the array $L_n$ holds the propagation losses for n places.

FIG. 5 shows an example of a propagation loss array for areas A1 to A11. The rows and columns of the array shows the path losses between pairs of areas. For example, a very low propagation loss of 45 dB is observed between areas A2 and A5, and, a high propagation loss of 99 dB is observed between areas A2 and A6, respectively. This means that by placing an AP in area A2, client devices located within area A5 will have a very good signal strength and will be thus able to use applications requiring very reliable time delivery of data packets, for example VoIP, streaming videos, etc., while client devices located within area A6 will receive low signal strength sufficient for basic connectivity only, for example receiving emails. As a result, by applying two thresholds, i.e. a lower and a higher value threshold, candidate areas for deploying mesh-operated APs and their corresponding coverage of the mesh-operated APs may be obtained, as detail below with reference to FIG. 6 and FIG. 7. The threshold values may be pre-defined and may be modified by the user.

First, candidate areas are identified by selecting pairs of areas with propagation losses, for example, equal to and lower than 80 dB. Candidate areas will therefore include the pairs of areas A2-A5, A2-A9, A3-A4, A3-A5 and so on. Then, the coverage areas of the APs are determined by selecting pairs of areas with propagation losses, for example, lower than 95 dB. Any pair of areas with propagation losses equal to and higher than 95 dB corresponds to coverage holes. For example, the pairs of areas A1-A9, A1-A10, A1-A11, A2-A6, A2-A5 and A2-A11 indicate which areas will not be covered even if a mesh-operated AP is placed within an area from the respective pair. From the coverage areas, the total number of areas covered by a respective AP is determined. The list of candidate areas is sorted as a function of the total number of areas covered by the respective AP (i.e. the coverage area of a respective AP) and the total coverage area of the mesh network with one AP, two APs, three APs and so on is determined therefrom. Finally, the areas for deploying an AP are determined, by assuring maximum coverage of the areas is provided and/or by satisfying any user preferences.

The user may enter preferences in the application, for example, once the measurements in the respective areas have been taken, while taking the measurements, or once the propagation loss array is computed. Depending on the user preferences, for example maximum number of mesh-operated APs, a preferred room or an area to place a mesh-operated AP, possible wired connections between rooms, the areas for deploying the mesh-operated APs are selected such that their coverage is maximized.

For example, if the user specifies that only one mesh-operated AP is to be deployed, an optimum coverage may be achieved if a mesh-operated AP is placed in area A5 (for example, the bedroom). Such a mesh network will provide coverage in 9 out of 11 areas. If, however, the user specifies that a preferred place to deploy the AP is in the living room, i.e. area A10, the mesh network will provide coverage in areas A2 to A5 and A8 to A10. In this case, the mesh network will provide coverage in 7 out of 11 areas. To provide maximized coverage for all areas within the indoor environment, an additional AP would have to be deployed, for example in area A8 which provides coverage to areas A1, A6 and A7 as well. As a result, a mesh network with two APs deployed in areas A8 and A10 are required to assure a maximized coverage, i.e. coverage in 10 out of 11 areas.

The mesh network configurations may be presented to the user in an easy to understand format, for example, in a textual or a graphical format. For example, a connected graph representation may be used to show a respective configuration of the mesh network; one node type in the graph may indicate the deployment areas of the mesh-operated APs, another node type the area of the mesh-operated AP acting as a gateway device and a further node type the areas covered by the APs, where the edges of the graph indicate the different areas covered by the respective APs. This way the user may easily understand the differences between the different mesh network configurations and possibly select one according to his preference.

FIG. 6 shows an example of a mesh network configuration with three APs deployed in areas A1, A5 and A10. Any of these AP may be functioning as a gateway device as well and thus providing access to the Internet. As it can be seen, traffic from client devices located in areas A2, A3 and A8 may be served by any of the APs, traffic from areas A6, A7 may be served by the APs deployed in areas A1 and A5, traffic from areas A4 and A9 may be served by the APs deployed in areas A5 and A10. However, client devices located in area A11 will not have access to any of the APs due to the very high propagation losses between areas A1, A5 and A10 and area A11, respectively. If coverage in area A11 is required, another mesh-operated AP for example in area A7 may be deployed, as the propagation loss between areas A11 and A7 is the lowest from the propagation losses between A11 and the areas with mesh-operated AP. The new mesh network configuration will have four APs deployed in the areas A1, A5, A7 and A10. In this example, the AP in area A7 connects to the Internet, via the AP in area A1 and area A5, or, via the AP in area A1 and A10. The connections between APs A1, A5 and A10 remain unchanged.

As detailed above, the communication bands (or frequency channels) of the already deployed APs are also recorded in the MAC list 340. Based on the recorded communication bands, information about the channel occupancy may be determined as follows. First, frequency channels are ordered based on their frequency. Since the frequency channels may have different bandwidths, for example 160 MHz, 80 MHz, 40 MHz, 20 MHz, etc., some of the frequency channels may overlap. For example, a frequency channel with 80 MHz bandwidth may overlap with four frequency channels with 20 MHz bandwidths. The level of occupancy of the frequency channels is then determined by considering the number of APs using a corresponding frequency channel. If two of the 20 MHz frequency channels are in use by two APs, an occupancy with a score of 2 is set for the 80 MHz frequency channel and a score of 1 for the corresponding 20 MHz channels. Additionally, If the 80 MHz frequency channel is in use by another AP, an occupancy score of 4 will added to the score for the 80 MHZ channel and occupancy score of 1 will be added to the score for each of the 20 MHz channels. If the 80 MHz is being used by two APs instead of one AP, a score of 8 will be added to the score for the 80 MHZ and a score of 2 will be added to the score for each of the 20 MHz channels. In this manner, the occupancy of the frequency bands is determined. Based on the occupancy score, the communication bands with the lowest occupancy may be selected.

In the case when the deployed APs have one radio interface and therefore use only one frequency channel for communication between the APs and for communication with the client devices, the recorded counts correspond to the channel occupancy. The lowest occupancy frequency channel for each of the possible bandwidths may be obtained. Any one of the frequency channels with the smallest count may be selected as the initial frequency for the mesh-operated APs.

In the case when the deployed APs have at least two radio interfaces, two or more frequency channels may be used simultaneously. For example, the frequency channel used for communication between the mesh-operated APs and the frequency channel used for communication between the mesh-operated APs and the client devices may be different. The former is herein referred as a mesh channel and the latter as a coverage channel. Furthermore, one or more of the mesh-operated APs may use different communication bands as coverage channels. In this case, the mesh frequency channel is determined in the same way as detailed above for the case when the APs have one radio interface. The coverage channel is assigned to the frequency channel with the lowest count and the mesh place, so each of the places or APs have a common frequency for the mesh an could have different frequencies for coverage.

A mesh-operated AP may be connected to one or more other APs. Therefore, it may be desirable to preserve a minimum transmission power among all APs within the mesh network, while maintaining the connection quality between them. The minimum transmission power for an AP to be deployed in area j may be estimated as follows $$\max_j\{\text{MaximumTxPower} - (th_1 - L_{ij})\} \quad (3)$$

where MaximumTxPower is the absolute maximum possible transmission power for the mesh wireless network, $th_1$ is the value used to identify candidate areas for deploying mesh-operate APs and $L_{ij}$ is the propagation loss value between a pair of areas. For example, for a mesh network operating at 2.4 GHz, the maximum transmission power is 23 dBm, $th_1$ may corresponds to the 80 dB and $L_{ij}$ may correspond to the values of the array of FIG. 5.

Figure 7:
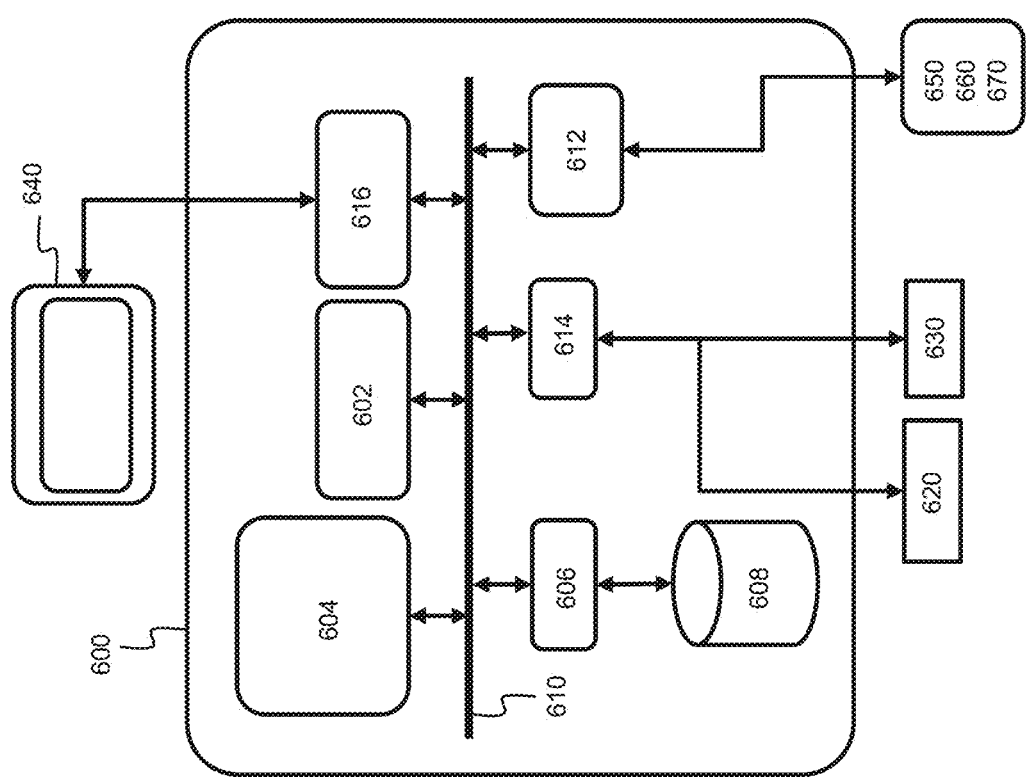
FIG. 7 shows an example embodiment of a suitable computing system 500 for performing one or several steps in embodiments of the invention.

FIG. 7 shows a computing system 600 suitable for performing various steps performed by an optical line terminal, OLT, in an optical network according to various embodiments of the present disclosure. Computing system 600 may in general be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or a read only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 650, 660, 670. The communication interface 612 of computing system 600 may be connected to such another computing system by means of a local area network, LAN, or a wide area network, WAN, such as for example the Internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example SATA disk drives, and control the reading and writing of data to and/or from these storage elements 608. Although the storage element(s) 608 above is/are described as a local disk, in general any other suitable computer-readable media such as a removable magnetic disk, optical storage media such as a CD or DVD, -ROM disk, solid state drives, flash memory cards, . . . could be used.

Such a computing system 600 is suitable for performing the various steps performed by the device 170. According to various embodiments of the present disclosure, the communication interface 612 allows the device to exchange information with other devices. For example, via the communication interface the system 600 may obtain the signal strengths measured which may be measured by another device. According to the example embodiments, the processor may be running a computer program code which allows the device to perform the various processing steps. More specifically, the program code performs the steps of: obtaining, channel strengths between access points, APs, and areas covered by the APs; determining from the obtained channel strengths, propagation losses between the areas; identifying first pairs of areas with lower propagation losses and second pairs of areas with higher propagation losses; selecting, from the first pairs of areas, candidate areas for deploying mesh-operated APs; and determining, from the second pairs of areas, coverage by the respective mesh-operated APs when deployed in one or more of the candidate areas. According to further example embodiments, the input interface 614 allows the device 170 to measure the RSSI values, detect the MAC addresses and the communication bands of the already deployed APs and record those in the memory.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method comprising:
obtaining, channel strengths between access points (APs) and coverage areas, the coverage areas being covered by at least one of the APs;
determining from the obtained channel strengths, propagation losses of multiple pairs of areas, each of the pairs of areas including two of the coverage areas;
identifying first pairs of areas among the pairs of areas with lower propagation losses and second pairs of areas among the pairs of areas with higher propagation losses;
selecting, from the first pairs of areas, candidate areas for deploying mesh-operated APs, each of the candidate areas being coverage areas included in one of the first pairs of areas;
determining wireless coverage in coverage areas included in the second pairs of areas by the respective mesh-operated APs when deployed in one or more of the candidate areas; and
selecting coverage areas from the candidate areas for deploying mesh-operated APs based on the determined wireless coverage in the coverage areas.

2. The method according to claim 1, wherein the selecting coverage areas selects the coverage areas from the candidate areas for deploying mesh-operated APs such that the wireless coverage is maximized.

3. The method according to claim 2, wherein the further selecting is based on one or more preferred areas for deploying mesh-operated APs and/or on a pre-determined maximum number of areas for deploying mesh-operated APs.

4. The method according to claim 1, wherein the method further comprises obtaining communication bands of the respective APs and selecting therefrom a communication band for the mesh-operated APs based on a lowest channel occupancy.

5. The method according to claim 4, wherein the selecting a communication band for the mesh-operated APs further comprises selecting a communication band for communication between the mesh-operated APs different from a communication band for communication between the mesh-operated APs and client devices located within the coverage areas.

6. The method according to claim 1, further comprising calculating a minimum transmission power for the mesh-operated APs based on the propagation losses.

7. The method according to claim 1, further comprising measuring a signal strength between a respective AP and a plurality of locations within a respective coverage area.

8. The method according to claim 7, further comprising calculating, from the measured signal strengths, a channel strength between the respective AP and the respective coverage area representative for the measured signal strengths.

9. The method according to claim 1, wherein the obtaining, the determining the propagation losses; the identifying first pairs of areas; the selecting, and the determining the wireless coverage are performed by processing circuitry located in a cloud server.

10. A device comprising a processing circuitry configured:
to obtain channel strengths between access points (APs) and coverage areas, the coverage areas being covered by at least one of the APs;
to determine, from the obtained channel strengths, propagation losses of multiple pairs of areas, each of the pairs of areas including two of the coverage areas;
to identify first pairs of areas among the pairs of areas with lowest propagation losses and second pairs of areas among the pairs of areas with highest propagation losses;
to select, from the first pairs of areas, candidate areas for deploying mesh-operated APs, each of the candidate areas being coverage areas included in one of the first pairs of areas;
to determine wireless coverage in coverage areas included in the second pairs of areas by the respective mesh-operated APs when deployed in one or more of the candidate areas; and
to select coverage areas from the candidate areas for deploying mesh-operated APs based on the determined wireless coverage in the coverage areas.

11. The device according to claim 10, wherein the processing circuitry is configured to select the coverage areas from the candidate areas for deploying mesh-operated APs based on the determined wireless coverage in the coverage areas such that wireless coverage is maximized.

12. The device according to claim 11, wherein the processing circuitry is configured to select coverage areas from the candidate areas based on one or more preferred areas for deploying mesh-operated APs and/or on a pre-determined maximum number of coverage areas for deploying mesh-operated APs.

13. The device according to claim 10, wherein the device further comprises a measuring circuitry configured to measure a signal strength between a respective AP and a plurality of locations within a respective coverage area; and
the processing circuitry is further configured to calculate, from the measured signal strengths, a mean channel strength between the respective AP and the respective coverage area.

14. A non-transitory computer readable storage medium comprising computer-executable instructions, which when executed by a computer, cause the computer to perform:
- obtaining, channel strengths between access points (APs) and coverage areas, the coverage areas being covered by at least one of the APs;
- determining from the obtained channel strengths, propagation losses of multiple pairs of areas, each of the pairs of areas including two of the coverage areas;
- identifying first pairs of areas among the pairs of areas with lower propagation losses and second pairs of areas among the pairs of areas with higher propagation losses;
- selecting, from the first pairs of areas, candidate areas for deploying mesh-operated APs, each of the candidate areas being coverage areas included in one of the first pairs of areas;
- determining wireless coverage in coverage areas included in the second pairs of areas by the respective mesh-operated APs when deployed in one or more of the candidate areas; and
- select coverage areas from the candidate areas for deploying mesh-operated APs based on the determined wireless coverage in the coverage areas.

* * * * *